(12) United States Patent
Gonzalez et al.

(10) Patent No.: US 9,050,578 B2
(45) Date of Patent: Jun. 9, 2015

(54) SULPHUR AND METALS REMOVAL PROCESS FOR FUELS THROUGH THE USE OF A MULTI-STAGE ULTRASOUND APPARATUS WITH THE ADDITION OF METHYLATE AND WATER/FLUORIDE MIX IN MULTIPLE SEPERATE STAGES

(71) Applicants: Carlos Jose Gonzalez, Cayey, PR (US); Miguel Jimenez, Zipaquira Cundinamarca (CO); Luis Fernando Gutierrez, Manizales (CO)

(72) Inventors: Carlos Jose Gonzalez, Cayey, PR (US); Miguel Jimenez, Zipaquira Cundinamarca (CO); Luis Fernando Gutierrez, Manizales (CO)

( * ) Notice: Subject to any disclaimer, the term of this patent is extended or adjusted under 35 U.S.C. 154(b) by 102 days.

(21) Appl. No.: 14/059,446

(22) Filed: Oct. 22, 2013

(65) Prior Publication Data
US 2015/0112111 A1 Apr. 23, 2015

(51) Int. Cl.
*B01J 19/00* (2006.01)

(52) U.S. Cl.
CPC .................................. *B01J 19/008* (2013.01)

(58) Field of Classification Search
None
See application file for complete search history.

(56) References Cited

U.S. PATENT DOCUMENTS

| 2008/0119421 A1* | 5/2008 | Tuszynski et al. | 514/34 |
| 2010/0124583 A1* | 5/2010 | Medoff | 426/2 |
| 2013/0011887 A1* | 1/2013 | Dayton et al. | 435/131 |

* cited by examiner

*Primary Examiner* — Tam M Nguyen

(57) ABSTRACT

The present invention provides a novel system and method for sulphur and metal removal from crude oil and all liquid fuel fractions to biofuels by means of ultrasonic cavitation to enhance chemical reactions of said contaminants with sodium or potassium methylate and a water/fluoride mix in separate stages obtaining a solid form which is filtered out by the use of a centrifuge system. The resulting fuel is molecularly stable and cleaner than regular fuels.

19 Claims, 9 Drawing Sheets

SULPHUR AND METALS REMOVAL PROCESS FOR FUELS THROUGH THE USE OF A MULTI-STAGE ULTRASOUND APPARATUS WITH THE ADDITION OF METHYLATE AND WATER/FLUORIDE MIX IN MULTIPLE SEPERATE STAGES

FIELD OF THE INVENTION

The present invention pertains mostly to the petrochemical sector. It relates to systems and methods for contaminant reduction in hydrocarbons and biofuels, mainly focused on the significant reduction of sulphur, and metals embedded in the fuel molecules, therefor improving fuel characteristics in the process.

BACKGROUND OF THE INVENTION

With decreasing reserves of light crude oil we have been led to extract lower quality crudes (sour crudes) which are high in sulphur and metals. The costs associated with de-contaminating, or elevating this crude to International fuel standards is much higher, requiring in some cases the purchase of lighter crudes to reduce contaminants in general due to a lack of cost effective technologies to completely eliminate or significantly reduce these contaminants. The petroleum industry is always looking for more economical ways to crack, distil, refine and improve on fuel characteristics. Recent environmental requirements for fuels to exceed EPA standards, and having the rest of the World focusing on the reduction of these contaminants as well, have prompted the industry to explore new methods to reduce these non-desired elements or substances in the least expensive manner.

The conventional process used in the petroleum industry for Sulphur reduction is known as hydrolysis. The hydrocarbon is reacted in one or more vessels, incorporating a hydrolysis catalyst and an absorption stage to trap the reacted sulphur. This occurs under high temperature and pressure conditions with sophisticated equipment and requires extensive footprint and energy resources.

Also, hydrocracking is a process used in the oil industry to convert low quality raw materials into higher-value fuel. This process is the best way to obtain a diesel fuel with lower sulphur content and aromatics. Normally the hydrocracking process is carried out using two suspended bed catalytic packed reactors that operate at high pressure and temperature. In the first reactor the molecule is ruptured, releasing sulfur and nitrogen, then the liquid fraction enters the second reactor where it is hydroisomerized and cracked. The hydrocracking process allows a variety of liquid fuels with certain undesirable characteristics to conform to existing environmental requirements.

These conventional processes have a high demand in energy and require large spaces for the process to take place, aside from the use of catalysts and other consumables which require periodical exchange or replacement. All this represents an added cost for the industry, especially now that we have to work with heavier fractions of sour crude oil.

SUMMARY OF THE INVENTION

The present invention provides a novel system and method for sulphur and metal removal from crude oil and all liquid fuel fractions.

According to an aspect of the invention, the system is a lower energy/power/heat consumption system.

According to another aspect of the invention, the method removes sulphur, zinc and silica by reacting with sodium methylate.

According to another aspect of the invention, the method removes sulphur, zinc and silica by reacting with potassium methylate.

According to another aspect of the invention, the method removes heavy metals by reacting with water.

According to still another aspect of the invention, the method improves the API index.

According to yet another aspect of the invention, the method creates cleaner fuels.

According to another aspect of the invention, the method can be applied to biofuels as well as hydrocarbon fuels.

According to yet another aspect of the invention, the method reduces associated system maintenance due to a cleaner combustion process.

According to yet another aspect of the invention, the method increases the volume of the treated fuel.

BRIEF DESCRIPTION OF THE DRAWINGS

Further features and advantages of the invention will become apparent from the following detailed description taken in conjunction with the accompanying figures showing illustrative embodiments of the invention, in which.

Figure 1:
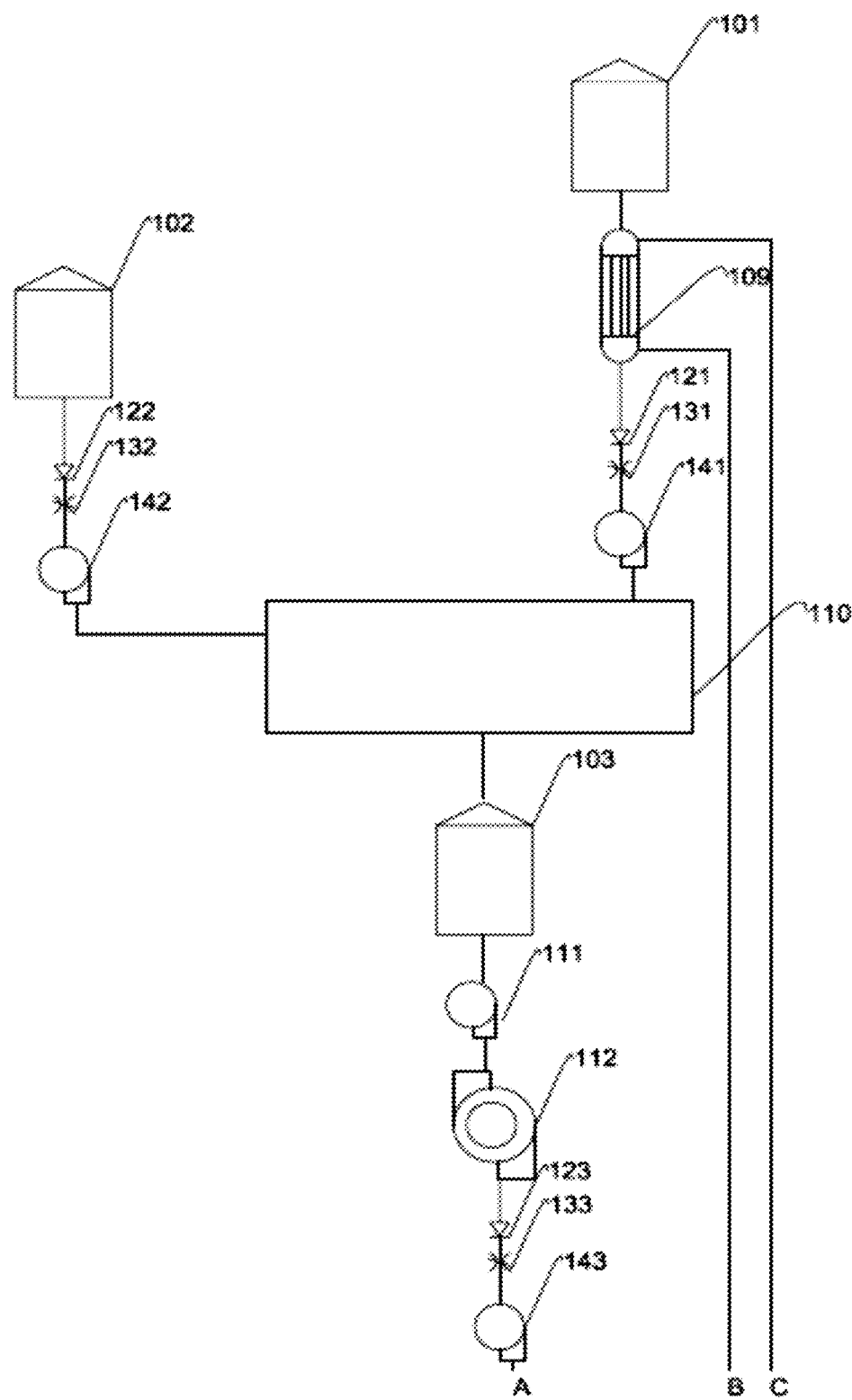
FIG. 1 illustrates the sulfur and heavy metal removal system, according to an embodiment of the present invention.
Figure 1:
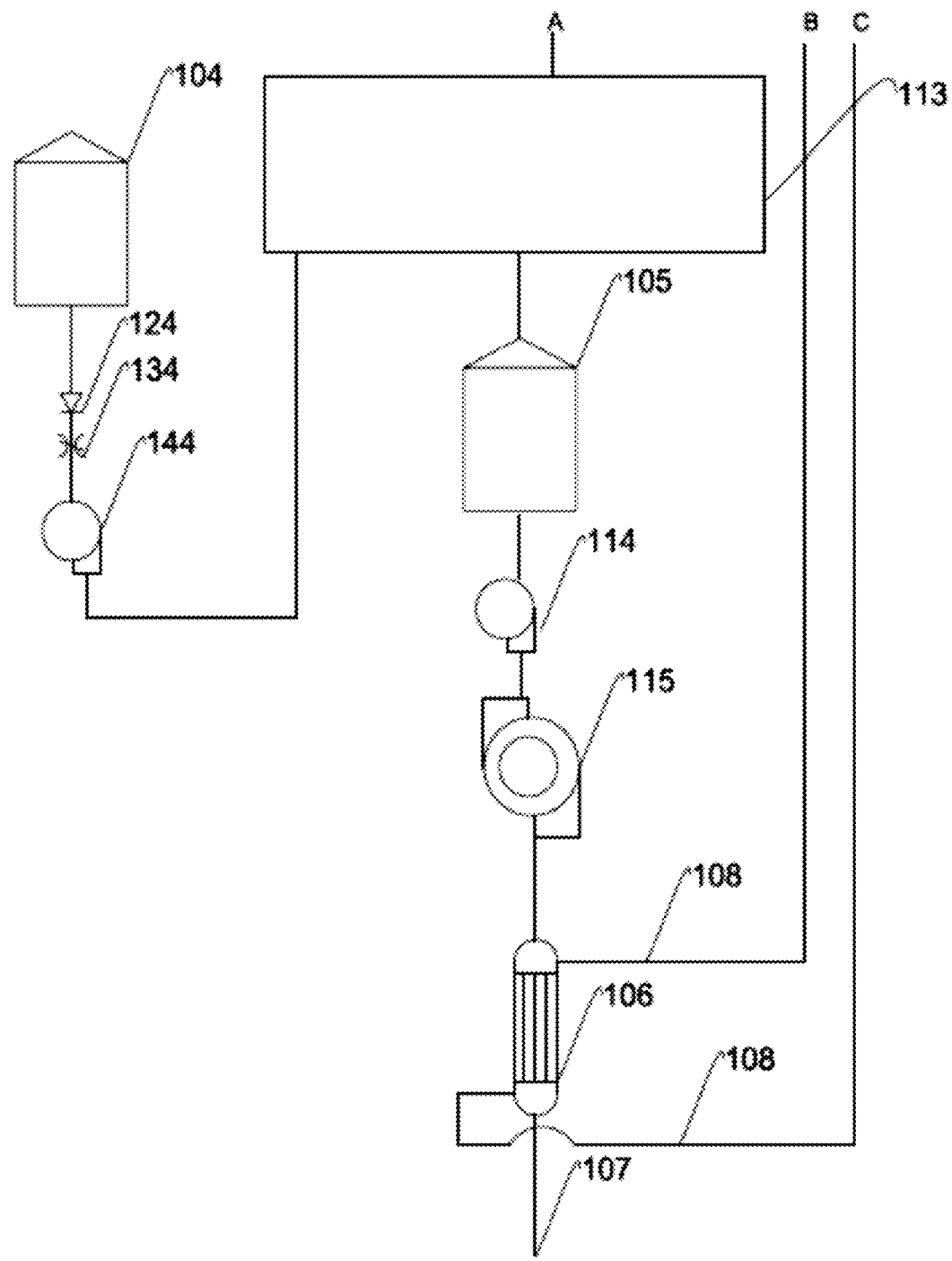

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

The method of the present invention, is based on the use of a mixing and dosing station, followed by an ultrasonic cavitation reactor coupled with a 300 atm. high pressure system in the presence of 5% Sodium or Potassium Methylate additives in one stage to react with the sulfur, zinc, and silica content in the fuel producing sulfates and salts that are collected in their solid form in a centrifuge filter station, and 20% water with 0.5% fluoride, on a secondary stage, that reacts with certain metals (Mercury Hg, Cadmium Cd, Lead Pb, and Vanadium) which are bonded to the fluoride molecules and removed in their solid form via centrifuge filtering station, ostensibly improving overall physical-chemical characteristics of the fuel during the process. Regardless of the fuel enhanced by the method, the resulting fuel will also have better characteristics, since polymeric molecules are broken and rearranged due to ultrasound enhanced chemical reactions, so that characteristics such as, for example, API in the case of crude oil, and flash point, Cetane level, and heating value in the case of diesel are substantially improved, among other treated fuels and improvements.

An ultrasonic cavitation reactor is a device which reproduces the cavitation phenomenon or cavitation bubbles in the liquid; here a fluid is subjected to a strong change of pressure with the aim of achieving a phase shift among other functions. In the reactor, pressure reached is equal to the vapor pressure of the fluid, causing the formation of cavitation bubbles known as cavities. These reactors provide the formation of cavities, which in turn implode generating high frequency pulses (ultrasonic waves) that shock the fluid causing the rupture and reorganization of the polymer chains in the fuel therefore allowing for new bonds to be attained with the introduced additives.

During the process of the present invention, the molecular rupture of the polymer chains forms what we call a "temporary active binding center", also known as radical, which is ready to combine chemically with the methylate molecules in the first stage and fluoride in the second stage. These active binding sites are joined with the desired molecules to react with the contaminant in the fuel, therefore disrupting the original bonds within the fuel before it is treated.

Any polymer chain fluid that is submitted to this strong pressure change suffers rupture and reorganization of its molecules. When the rupture occurs, unstable molecular "active" sites are formed and become available to be combined in situ with other molecules (additives). The formation of these active sites is what makes possible the reorganization and recombination of the fuel's molecules therefore improving the fuel's overall quality and characteristics, as well as the removal of unwanted contaminants.

Molecular rupture caused by the process of the present invention is used to liberate the undesired contaminating molecules and reacting them with methylate and fluoride to create new bonds that are easily removed from the stream. Since we must dilute fluoride in water, the excess H2O forms a new polymer chain in the fuel containing hydrogen and oxygen within its final structure. This process improves the treated fuels, increasing the volume of the finished product by the determined percentage, enhancing features and characteristics while remaining molecularly_stable.

The physics and chemistry behind the process of the present invention is based on studies of the induced sonochemical reactions on inorganic and organic material after being submitted to ultrasound. In the process of the present invention, the ultrasound energy is supplied by the formation of cavities in the fluid due to the change in pressure induced by the ultrasonic cavitation reactor. The high inlet pressure is violently reduced inside the reactor, causing a thermodynamic change which is used to aid in the formation of cavities within the fluid (cavitation bubbles). When the fluid returns to its initial conditions the cavities then collapse and release a large amount of energy which is absorbed by the fluid rupturing its molecular structure and reorganizing the molecules in a more orderly and stable form for combustion. The intensity in which we create the cavities or cavitation bubbles within the fluid is a function of the system's pressure which also determines the frequency and the intensity of the shock wave that causes the molecular rupture.

During the phenomenon of creation and subsequent collapse of cavities or cavitation bubbles, the process of the present invention reaches up to 500 atmospheres of localized pressure and hundreds of degrees in temperature, which rupture all polymer chain liquid fluid molecules. This same energy is used to form new polymer chains that are more stable, allow us to remove undesired elements or compounds in the fuel and also results in a fuel with better properties for combustion.

Based on the above explanation, it is clear that the reactions happen due to a local increase in the temperature, pressure and the formation of molecular radicals. All of these chemical and physical changes are due to the rupture of the fluid molecular links caused by the collapse of the cavitation bubbles created during the process of cavitation. Depending on the nature of the liquid being cavitated, different effects can be obtained such as: radical creation, depolymerization, Lysis, liquid emulsions, rupture of solid particles, and acceleration of chemical reactions, among others.

FIG. 1 illustrates an embodiment of the present invention used to remove fuel contaminants such as sulfur, zinc, silica, mercury, lead, among others, as well as fuel volume increase. The system improves fuels to produce less polluting fuels as well as increasing its final volume. The system comprises a first stage dosing, mixing, and ultrasonic cavitation station 110, a centrifuge filtering system 112, and a heat exchanger 109. The dosing and mixing station receives fuel from fuel tank 101 which is preheated by a heater 109, as well as methylate from storage tank 102 by means of pumps 141,142. Before arriving at the station 110 the various liquids travel through a check valve 121,122 and each flow is controlled by volume through an adjustable control flow valve 131,132. At the dosing and mixing station in 110 liquids are kept for ten minutes (10 min.) while a micro emulsion is obtained. After this, the mixture passes through a high-pressure pump where the fluid reaches a high pressure of 300 atmospheres. At this high pressure, the fluid enters the ultrasonic cavitation reactor in 110 where cavitation bubbles form and the depolymerization and the desired reactions take place. After the mixture has been cavitated under the mentioned pre-established pressure, the treated fuel is stored in the insulated storage tank 103 for pressure release. The treated fuel is then pumped through pump 111 and filtered through the centrifuge 112 to remove the resulting solids. The fuel is then ready to move to the second stage for metal removal. The second stage system comprises a dosing, mixing, and ultrasonic cavitation station 113, a centrifuge filtering system 115, and a heat exchanger 106. The dosing and mixing station receives fuel from fuel tank 103 which has been treated at the first stage, as well water/fluoride from storage tank 104 by means of pumps 143,144. Before arriving at the station 113 the various liquids travel through a check valve 123,124 and each flow is controlled by volume through an adjustable control flow valve 133,134. At the dosing and mixing station in 113 liquids are kept for ten minutes (10 min.) while a micro emulsion is obtained. After this, the mixture passes through a high-pressure pump where the fluid reaches a high pressure of 300 atmospheres. At this high pressure, the fluid enters the ultrasonic cavitation reactor in 113 where cavitation bubbles form and the depolymerization and the desired reactions take place. After the mixture has been cavitated under the mentioned pre-established pressure, the treated fuel is stored in the insulated storage tank 105 for pressure release. The treated fuel is then pumped through pump 114 and filtered through the centrifuge 115 to remove the resulting solids. The final clean fuel goes through a heat exchanger 106, before exiting through outlet 107, to remove the temperature increase that results from the cavitation by means of the recycling of the closed loop system 108.

Figure 2:
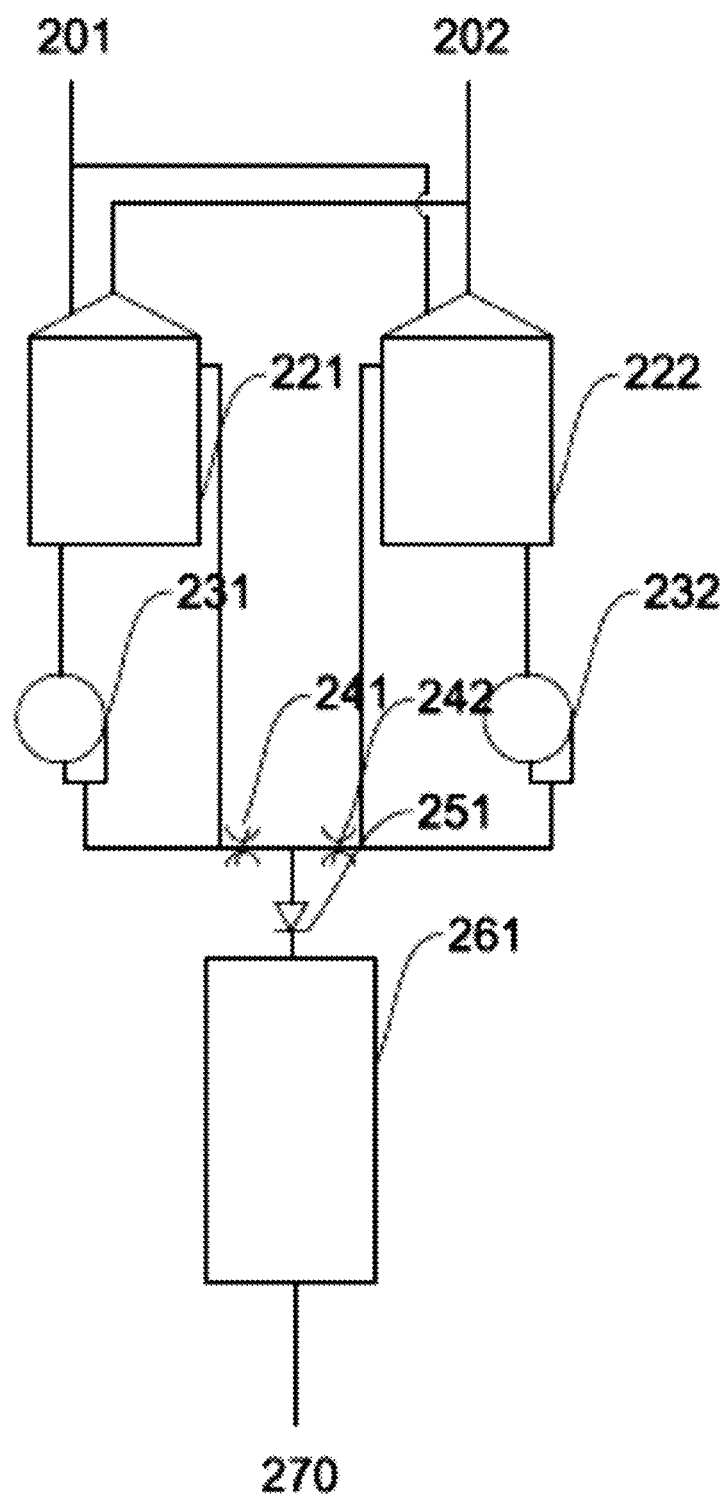
FIG. 2 illustrates a dosing, mixing and cavitation configuration, according to an embodiment of the present invention.

FIG. 2 illustrates the dosing, mixing, and cavitation station 110,113 from FIG. 1 comprising two mixing tanks 221,222, which receive water/fluoride or methylate through pipe 201, and preheated fuel from pipe 202. The mixing that takes place in the tanks 221,222 occurs by recirculating with a high pressure pump 231,232. Mixing takes place for a pre-determined amount of time as stated above, at such time a computer-controlled valve 241,242 is opened, allowing the mixed fluid to enter the ultrasonic cavitation reactor 261. After the mixture has been cavitated under pre-established pressure, the chemically treated fuel is sent through a pipe 270 to the insulated storage tank.

Figure 3:
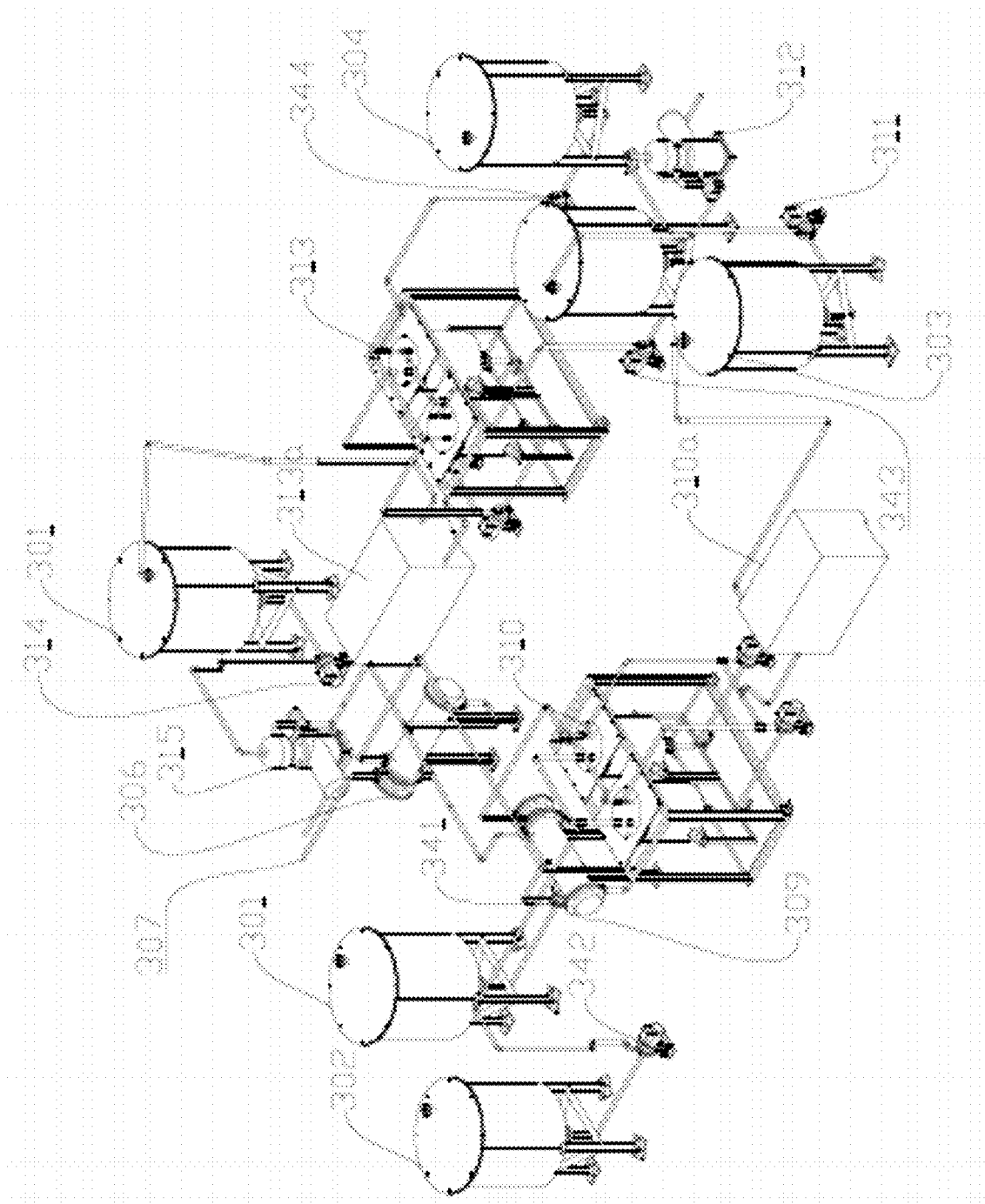
FIG. 3 illustrates an isometric view of the sulfur and heavy metal removal system, according to an embodiment of the present invention.

The illustration shown in FIG. 3 is an isometric representation for the embodiment of the present invention used to remove fuel contaminants such as sulfur, zinc, silica, mercury, lead, among others, as well as fuel volume increase. The system improves fuels to produce less polluting fuels as well as increasing its final volume. The system comprises a first stage dosing and, mixing station 310 and an ultrasonic cavitation reactor 310a, a centrifuge filtering system 312, and a heat exchanger 309. The dosing and mixing station receives fuel from fuel tank 301 which is preheated by a heater 309, as well as methylate from storage tank 302 by means of pumps 341,342. At the dosing and mixing station 310 liquids are kept for ten minutes (10 min.) while a micro emulsion is obtained. After this, the mixture passes through a high-pressure pump where the fluid reaches a high pressure of 300 atmospheres. At this high pressure, the fluid enters the ultrasonic cavitation reactor 310a where cavitation bubbles form and the depolymerization and the desired reactions take place. After the mixture has been cavitated under the mentioned pre-established pressure, the treated fuel is stored in the insulated storage tank 303 for pressure release. The treated fuel is then pumped through pump 311 and filtered through the centrifuge 312 to remove the resulting solids. The fuel is then ready to move to the second stage for metal removal. The second stage system comprises a dosing and mixing station 313, an ultrasonic cavitation reactor 313a, a centrifuge filtering system 315, and a heat exchanger 306. The dosing and mixing station receives fuel from fuel tank 303 which has been treated at the first stage, as well water/fluoride from storage tank 304 by means of pumps 343,344. At the dosing and mixing station 313 liquids are kept for ten minutes (10 min.) while a micro emulsion is obtained. After this, the mixture passes through a high-pressure pump where the fluid reaches a high pressure of 300 atmospheres. At this high pressure, the fluid enters the ultrasonic cavitation reactor 313a where cavitation bubbles form and the depolymerization and the desired reactions take place. After the mixture has been cavitated under the mentioned pre-established pressure, the treated fuel is stored in the insulated storage tank 305 for pressure release. The treated fuel is then pumped through pump 314 and filtered through the centrifuge 315 to remove the resulting solids. The final clean fuel goes through a heat exchanger 306, before exiting through outlet 307.

Figure 4:
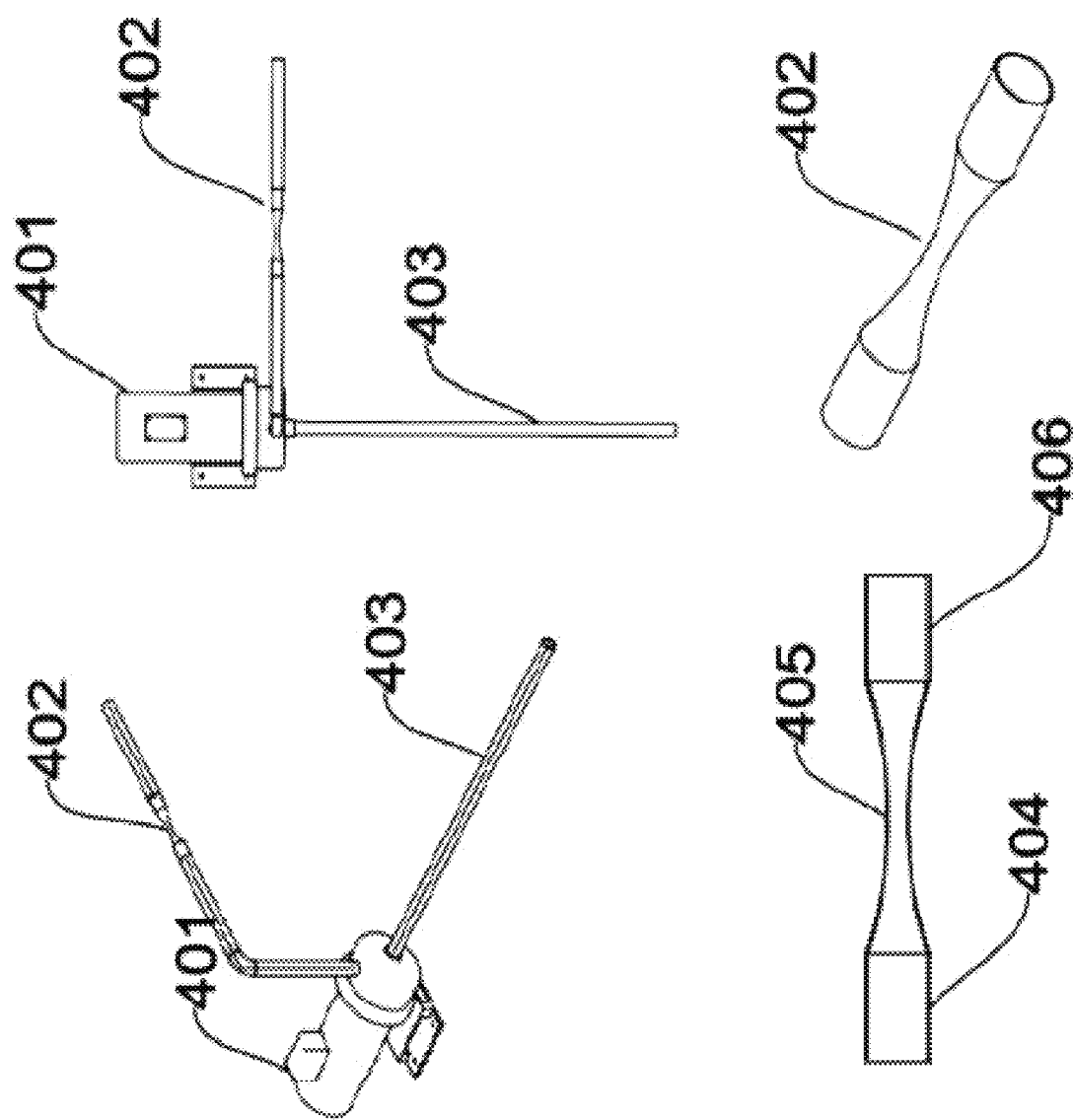
FIG. 4 illustrates a hydrodynamic cavitation reactor system, according to a preferred embodiment of the invention.

FIG. 4 illustrates an ultrasonic cavitation reactor of the present invention. In a preferred embodiment the hydrodynamic cavitation reactor is made from stainless steel. The system comprises a high pressure pump 401 set at 300 atmospheres, a cavitation valve 402, a Schedule 40 SS 1" diameter pipe 403, all contained in one module, specifically the valve 402 contains the following zones; liquid entrance zone 404, a cavitation bubble formation zone 405, and a shock zone 406 where the molecular rupture and reorganization occurs.

Figure 5:
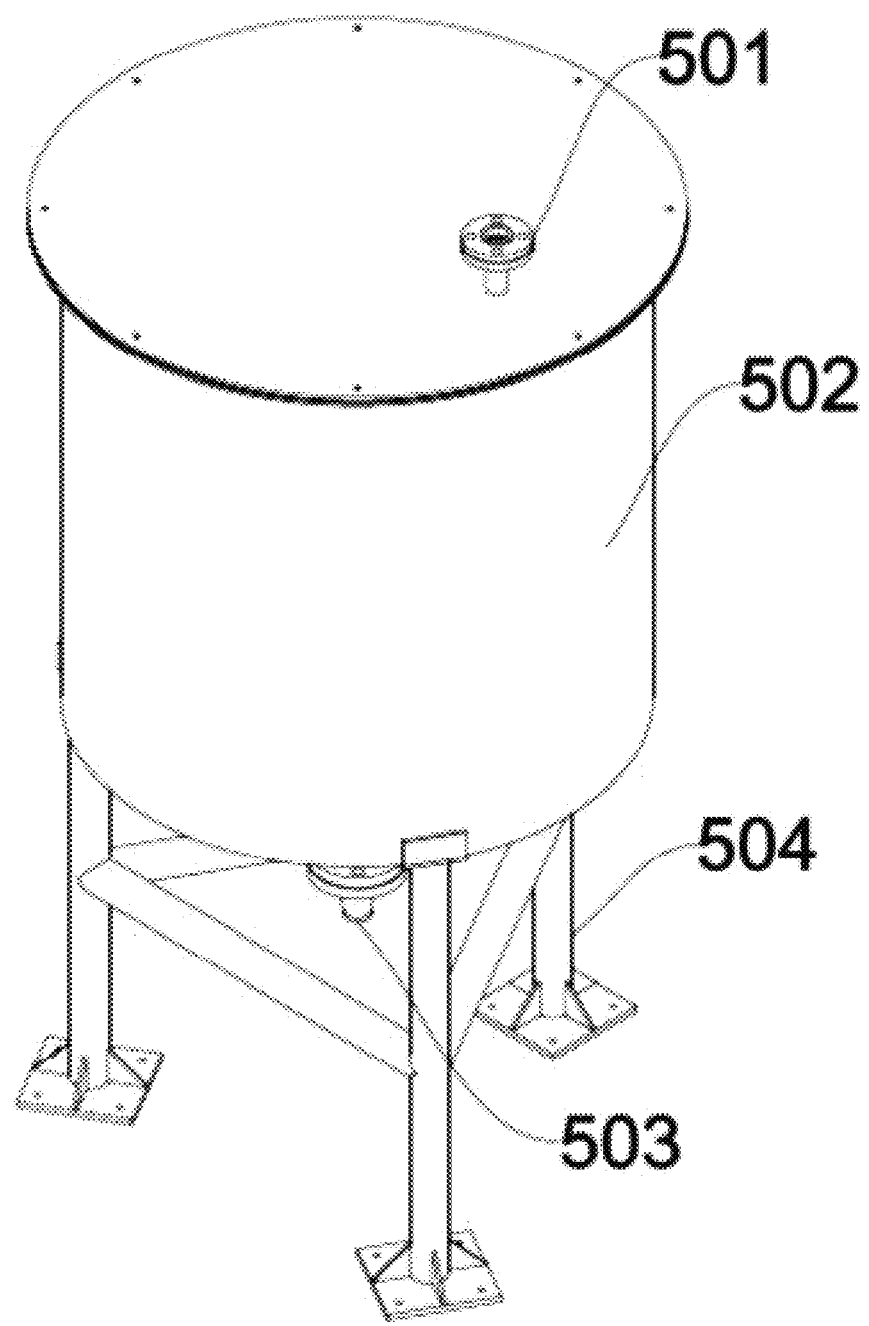
FIG. 5 illustrates an isometric view of water and methylate tank system, according to an embodiment of the present invention.

FIG. 5 illustrates a water/fluoride and methylate storage tank of the present invention. In a preferred embodiment the water and methylate storage tank is made from stainless steel. The system comprises an entrance pipe connector 501, a cylindrical tank, among other shapes 502, an exit pipe connector 503, and a support frame 504 when deemed necessary.

Figure 6:
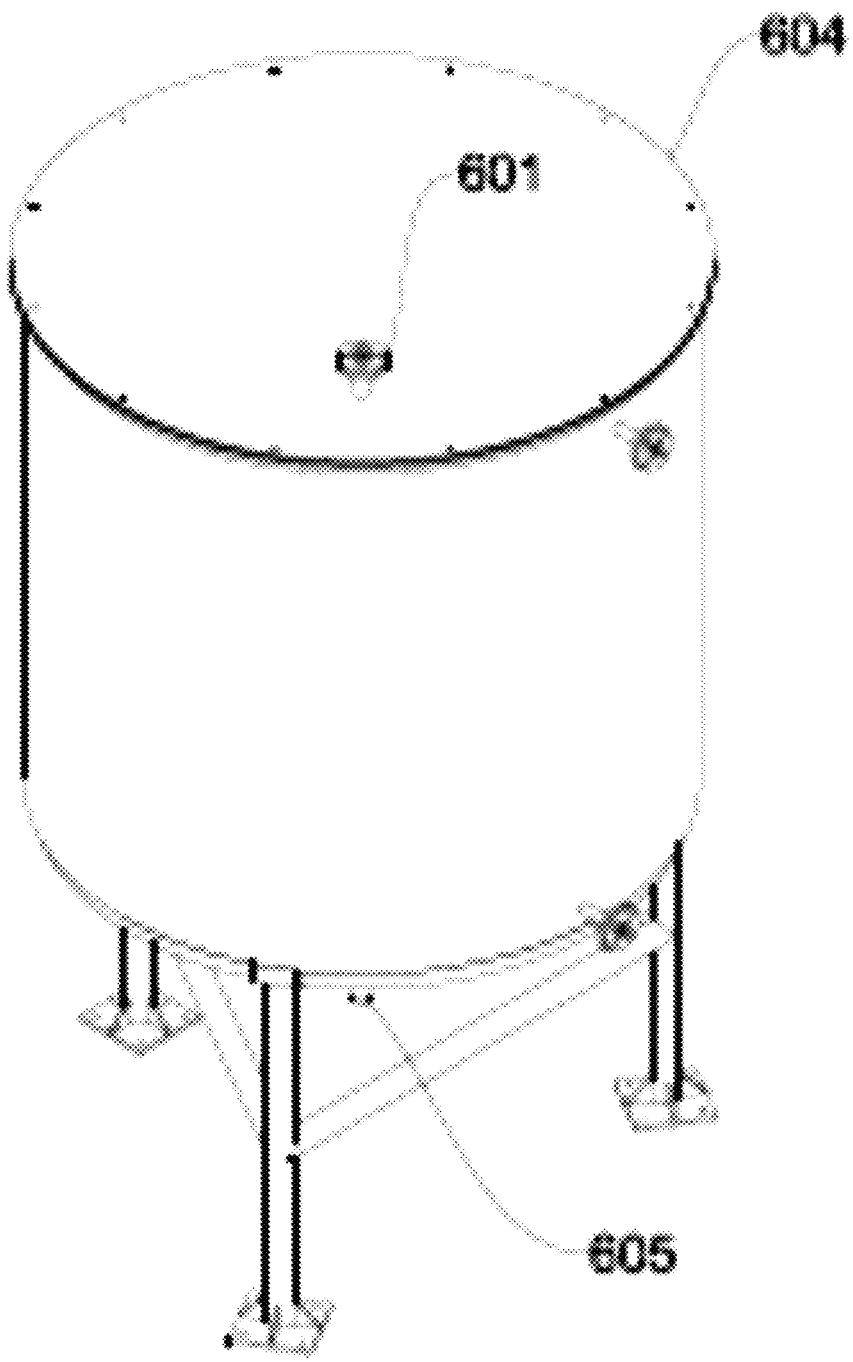
FIG. 6 illustrates a treated fuel pressure release tank, according to an embodiment of the present invention.

FIG. 6 illustrates a fuel storage tank of the present invention. In a preferred embodiment the fuel storage tank is made from stainless steel. The system comprises an entrance pipe connector 601, a cylindrical tank, among other shapes 604, an exit pipe connector 605, and a support frame when deemed necessary.

Figure 7:
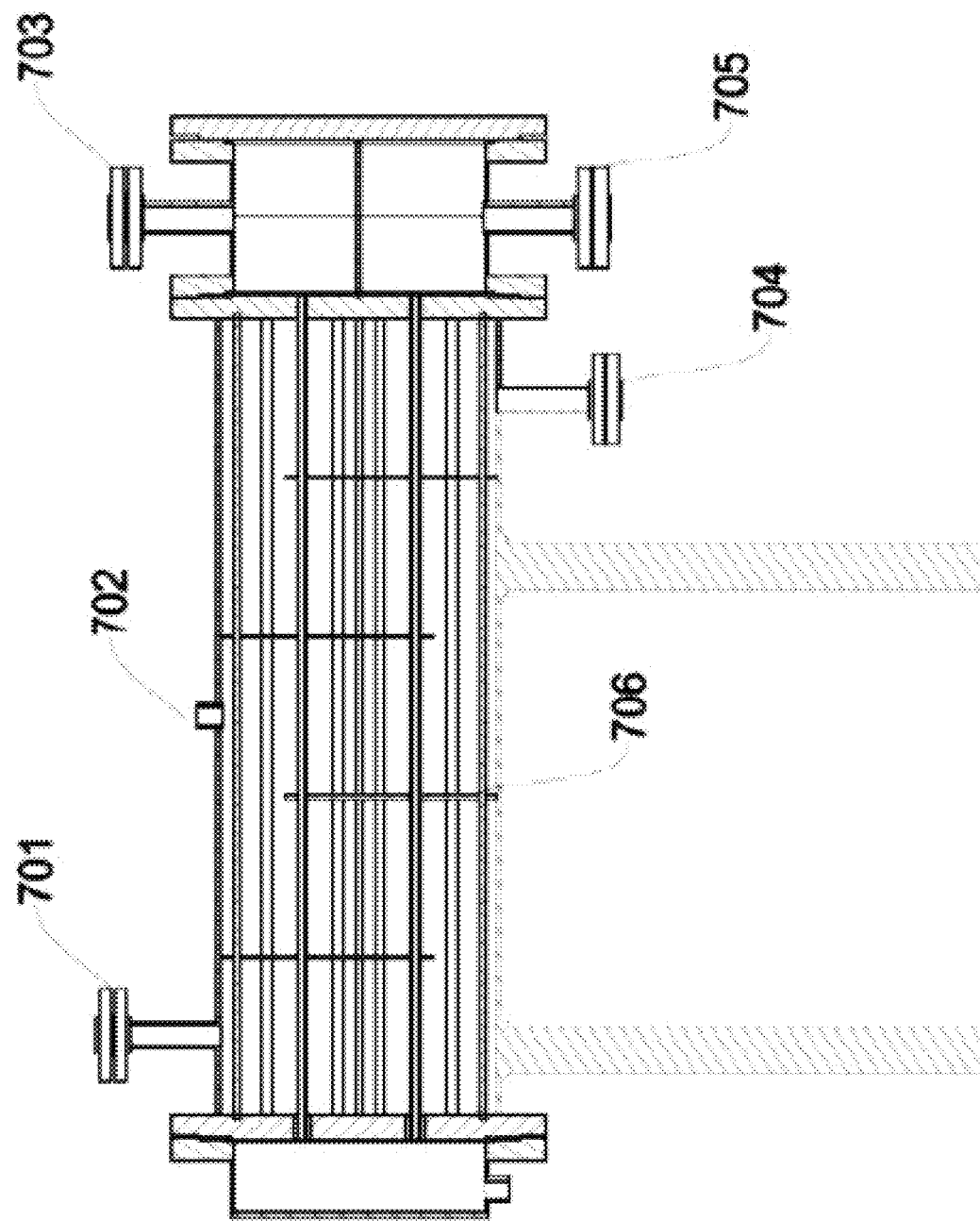
FIG. 7 illustrates a heat exchanger, according to an embodiment of the present invention.

In a preferred embodiment the heat exchanger is a shell and tube type heat exchanger as illustrated in FIG. 7. In a preferred embodiment the heat exchanger is made from stainless steel. The system comprises a cooling liquid entrance pipe connector 701, a temperature sensor 702, a treated fuel entrance pipe connector 703, a cooling liquid exit pipe connector 704, a treated fuel exit pipe connector 705, and four baffles 706 to ensure proper heat exchange between fluids.

Figure 8:
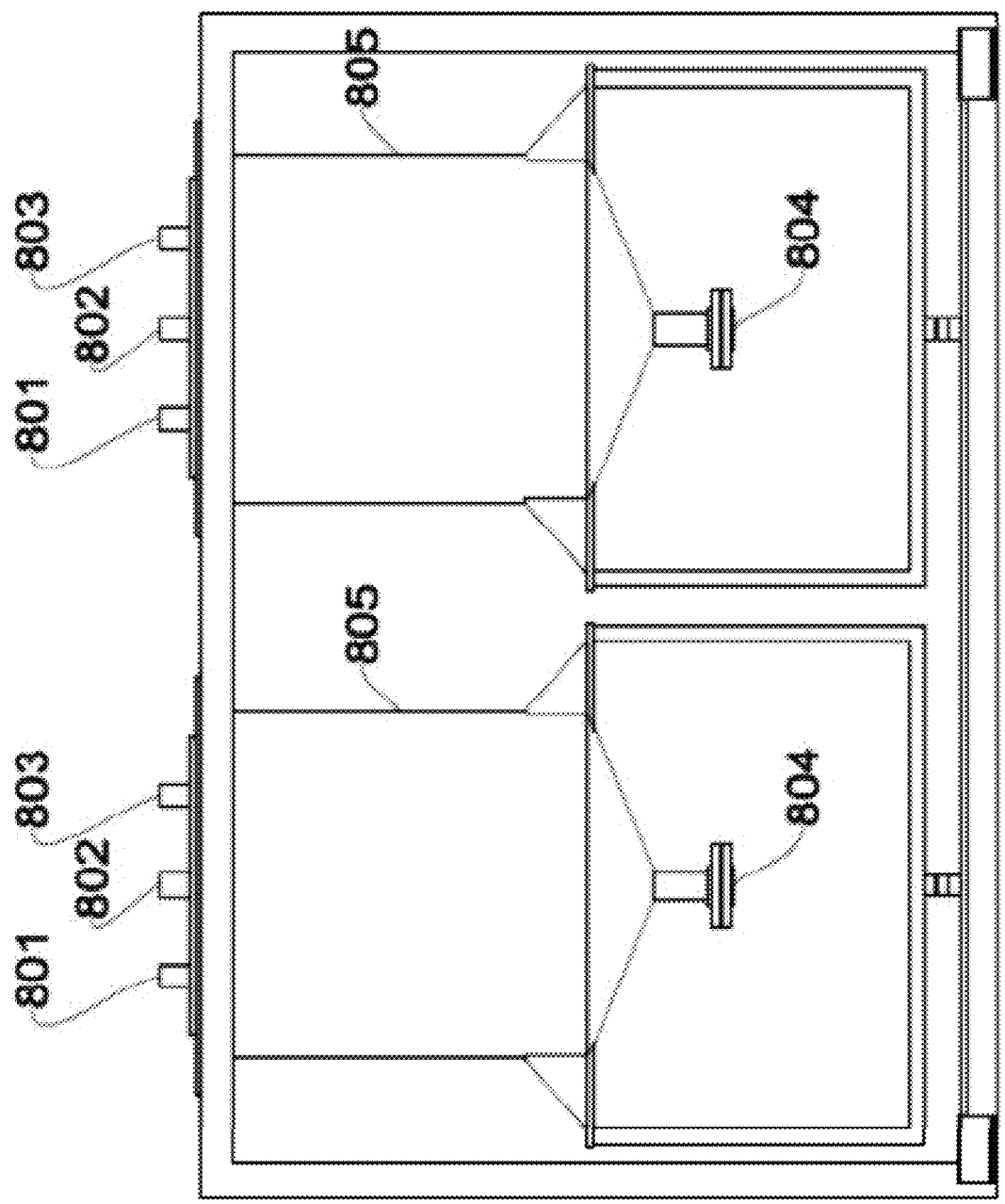
FIG. 8 illustrates a dosing and mixing unit, according to an embodiment of the present invention.

FIG. 8 illustrates the dosing and mixing station of the present invention. In a preferred embodiment the dosing and mixing station is made from stainless steel. The system comprises a water or methylate entrance pipe connector 801, a fuel entrance pipe connector 802, and an extra connector 803 which is used for cleaning, a cylindrical tank, among other available shapes 805, a mixed fuel/water or fuel/methylate emulsion exit pipe connector 804, all held together with a steel frame.

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

We claim:

1. A method for molecular rupture and recombination of fuels with additives or fuel enhancers comprising:
   preheating fuel;
   mixing said preheated fuel with sodium or potassium methylate in a first stage for ten minutes for a micro-emulsion mixture to form;
   passing said mixture through a pump until 300 atmospheres of pressure is reached; and
   directing the mixture to an ultrasonic cavitation reactor where cavitation bubbles are formed and collapse to allow depolymerization and reaction of sulfur, silica, and zinc with the methylate to form solids for later removal from the fuel.

2. The method of claim 1, wherein said modified fuel is stored in an insulated storage tank.

3. The method of claim 1, further comprising a centrifuge filter to remove solid contaminates from the treated fuel.

4. The method of claim 3, wherein said treated fuel is mixed with water containing 0.5% fluoride in a second stage for ten minutes for a micro-emulsion mixture to form; passing said mixture through a pump until 300 atmospheres of pressure is reached; and directing the mixture to an ultrasonic cavitation reactor where cavitation bubbles are formed and collapse to allow depolymerization and reaction of mercury, cadmium, lead, and vanadium with the fluoride to form solids for later removal from the fuel.

5. The method of claim 4, wherein said modified fuel is stored in an insulated storage tank.

6. The method of claim 4, further comprising a centrifuge filter to remove solid contaminates from the treated fuel.

7. The method of claim 4, wherein heat generated by the cavitation process is used to preheat said fuel.

8. The method of claim 1, wherein said fuel comprises diesel fuel mixed with sodium or potassium methylate at 5%.

9. The method of claim 4, wherein said fuel comprises diesel fuel mixed with water/fluoride at a ratio of 20% water 0.5% fluoride.

10. The method of claim 1, wherein said fuel comprises bunker fuel oil mixed with sodium or potassium methylate at 5%.

11. The method of claim 4, wherein said fuel comprises bunker fuel oil mixed with water/fluoride at a ratio of 20% water 0.5% fluoride.

12. The method of claim 1, wherein said fuel comprises gasoline mixed with sodium or potassium methylate at 5%.

13. The method of claim 4, wherein said fuel comprises gasoline mixed with water/fluoride at a ratio of 10% water 0.5% fluoride.

14. The method of claim 6, wherein all modified fuels have a removal of contaminates resulting in a sulfur content of less than 5 ppm.

15. The method of claim 14, wherein all modified fuel allows the reduction of emission of: CO by 70%, $NO_x$ between 25-50%, and $SO_2$ between 95-100%.

16. The method of claim 1, wherein said fuel comprises crude oil mixed with sodium or potassium methylate at 5% and has a reduction of sulfur between 95% and 100%.

17. The method of claim 4, wherein said fuel comprises crude oil and the modified fuel has a decrease in viscosity between 30% and 45% and a gain in API index between 10% and 70%.

18. The method of claim 1, wherein said fuel comprises Pyrolytic fuel oil mixed with sodium or potassium methylate at 5% and has a reduction of sulfur between 95% and 100%.

19. The method of claim 4, wherein said fuel comprises Pyrolytic fuel oil mixed with water/fluoride at a ratio of 20% water 0.5% fluoride.

* * * * *